Oct. 29, 1940. J. L. STEPHAN 2,220,029
LEVEL
Filed April 29, 1940
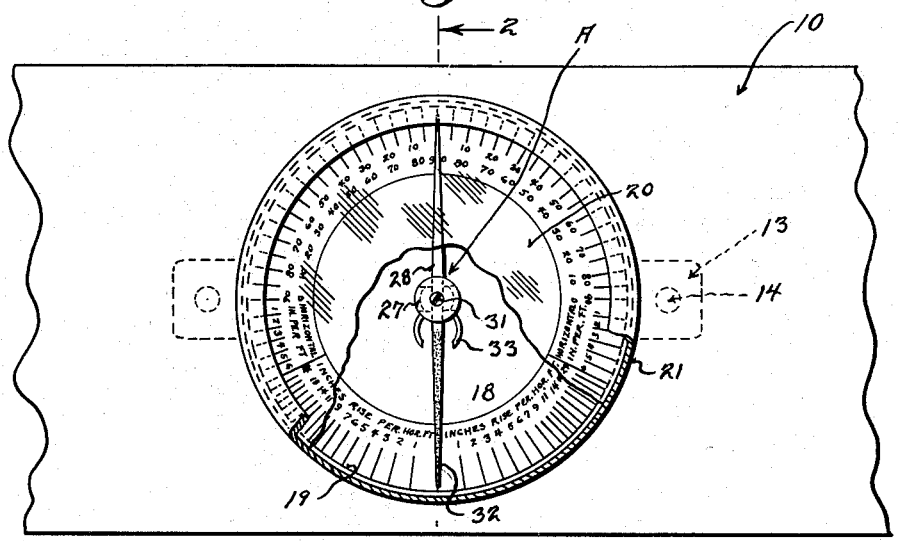
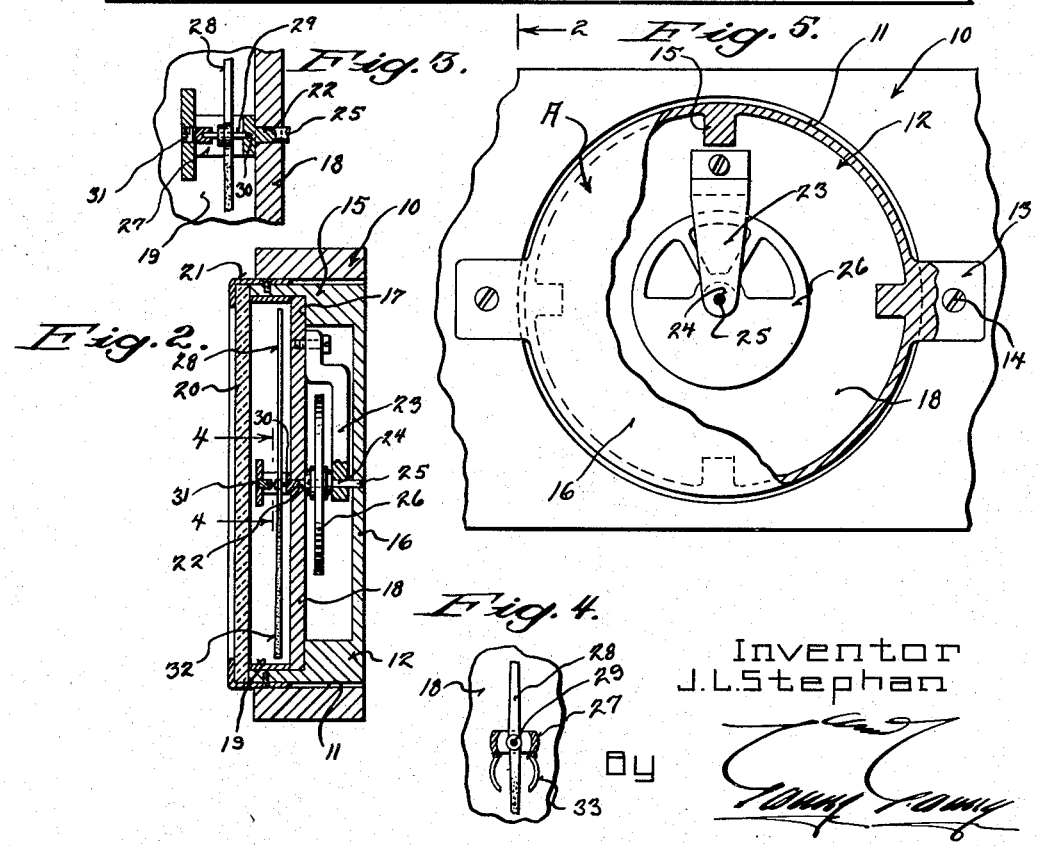
Inventor
J. L. Stephan
By
Attorneys Patented Oct. 29, 1940

2,220,029

UNITED STATES PATENT OFFICE 2,220,029

LEVEL

James L. Stephan, Wisconsin Dells, Wis., assignor of fifty-one per cent to Walter Stanton, and nineteen per cent to Sebastian Wenker, both of Wisconsin Dells, Wis.

Application April 29, 1940, Serial No. 332,314

2 Claims. (Cl. 33—215)

This invention appertains to implements or devices for indicating the angular position of a body relative to the horizontal.

One of the primary objects of my invention is to provide a level or like device having a pointer for accurately indicating the angular position of a body relative to the horizontal, suspended in a novel manner, so that the pointer will not be affected by shocks, jars, vibrations, etc.

Another salient object of my invention is to provide a shaft held in a predetermined position by a pendulum weight, with an indicating pointer delicately balanced on the shaft and movable relative thereto, the balanced pointer quickly arriving at a position of rest relative to a graduated dial, irrespective of continued swinging movement of the pendulum shaft.

A further object of my invention is to provide means on the shaft for limiting the swinging movement of the balanced pointer relative to the shaft, whereby the pointer will move with the shaft when the instrument is turned beyond a predetermined angle, the means on the shaft also acting to quickly stop the swinging of the pointer relative to the shaft after the instrument comes to a rest.

A still further object of my invention is to provide a double-hung pendulum pointer for use in various fields, such as builders' plumbs and levels, aeroplanes, railroad track gauges, surveying instruments, engineering instruments and equipment, etc.

With these and other objects in view, the invention consists in the novel construction, arrangement, and formation of parts, as will be hereinafter more specifically described claimed, and illustrated in the accompanying drawing, in which drawing:

Figure 1 indicates a front elevational view of my device and shows the principles of the invention used in the stock of a builders' level.

Figure 2 is a transverse, sectional view through the level, taken on the line 2—2 of Figure 1, looking in the direction of the arrows.

Figure 3 is an enlarged, fragmentary, detail, sectional view illustrating one form of means for delicately suspending the weighted pointer on the pendulum shaft.

Figure 4 is a detail, sectional view taken on the line 4—4 of Figure 2, looking in the direction of the arrows, illustrating the means for limiting the swinging movement of the pointer relative to the pendulum shaft.

Figure 5 is a rear elevational view of my device, showing parts thereof broken away and in section.

Referring to the drawing in detail, wherein similar reference characters designate corresponding parts throughout the several views, the letter A generally indicates my novel appliance, and, for the purpose of illustration, I have shown the appliance A applied to the stock 10 of a carpenter's or mason's level.

The principles of my device can be used for many purposes, and, for the sake of brevity, I have illustrated only one use thereof.

As illustrated, the appliance A includes a substantially circular case 12, and the stock 10 of the level is provided with an opening 11 for receiving the case 12. Outwardly extending ears 13 are formed on the case to permit the connection of the appliance to the stock 10 by means of screws 14.

The circular case 12 includes an annular side wall 15 and a disc-shaped back wall 16. The side wall 15 is shouldered to provide an annular seat 17 on which is fitted the dial plate 18. The dial plate 18 can be held on the shoulder 17 in any preferred way, and, as illustrated, a removable ring 19 is fitted in the case against the outer face of the dial plate, and this ring is engaged by the transparent cover plate 20 of the case. The transparent cover plate 20 of the case is, in turn, held in position by a removable bezel ring 21.

The axial center of the dial plate 18 is provided with a bearing opening 22, and the rear face of the dial plate carries a bearing bracket 23, which has formed therein, in axial alinement with the bearing opening 22, a bearing opening 24. The bearing openings 22 and 24 receive a rotatable shaft 25 on which is pinned or otherwise secured a pendulum weight 26.

The end of the shaft 25, which protrudes through the axial center of the dial plate 18 carries a slotted head 27, and this slotted head receives therein the freely movable pointer 28. The pointer 28 is delicately suspended in the slotted head 27, and the pointer, intermediate its ends, carries an arbor 29, the ends of which are accurately tapered. The head carries bearings 30 and 31 for the pointed ends of the arbor 29, and these bearings may or may not be of the jeweled type. It is to be noted, however, that the bearing 31 is adjustable in or out of the slotted head for facilitating the placing of the pointer in position. The lower end of the pointer is weighted, as at 32, so that the same will normally hang down.

From the description so far, it will be seen that the weight 26 will hold the shaft 25 in a predetermined position, and that the weight 32 on the pointer 28 will hold the pointer in a certain position, irrespectively of the movement of the case 12 or the level stock 10.

The slotted head 27 on each side of the pointer 28 is provided with fine leaf-spring stops 33 for the pointer, and these stops limit the swinging movement of the pointer relative to the pendulum shaft 25.

The dial plate can be graduated to the best advantage to agree with the use to which the instrument will be put. In the present instance, the upper part of the dial is graduated to indicate degrees of a circle, and the lower part of the dial can be graduated to indicate pitch in inches per foot of timbers in carpenters' work.

In the use of my instrument, the pointer or needle 28 being doubly suspended or hung within the case will not be affected by jars or vibrations; and, likewise, the pointer will quickly come to a rest after the case has been moved to a predetermined position. Thus, calculations can be instantly and quickly made. The resilient leaf-spring fingers 33 stop the swinging movement of the pointer, and, hence, permit the quick settling of the pointer to a position of rest, and these fingers also insure the proper position of the pointer relative to the shaft at all times, irrespective of the revolving of the case 12 in complete turns.

From the description it can be seen that I have provided a sensitive instrument for accurately indicating the change in the position of a body from the horizontal.

Changes in details may be made without departing from the spirit or the scope of my invention, but what I claim as new is:

1. An instrument comprising, a case, a graduated dial plate fitted in said case having an axial opening, a bearing bracket secured to the dial plate having a bearing opening in axial alinement with the bearing opening in the dial plate, a shaft mounted for free rotation in said bearing openings, a weighted wheel on said shaft and secured thereto for maintaining the shaft in a predetermined position, a slotted head on the forward end of the shaft extending in front of the graduated dial plate, a pointer having a lower weighted end received in the slotted head, said pointer being provided intermediate its ends with an arbor, and bearings carried by the slotted head for receiving the arbor.

2. An instrument comprising, a case, a graduated dial plate fitted in said case having an axial opening, a bearing bracket secured to the dial plate having a bearing opening in axial alinement with the bearing opening in the dial plate, a shaft mounted for free rotation in said bearing openings, a weighted wheel on said shaft and secured thereto for maintaining the shaft in a predetermined position, a slotted head on the forward end of the shaft extending in front of the graduated dial plate, a pointer having a lower weighted end received in the slotted head, said pointer being provided intermediate its ends with an arbor, and bearings carried by the slotted head for receiving the arbor, one of said bearings for the arbor being adjustable.

JAMES L. STEPHAN.